United States Patent
Lindstrom

(10) Patent No.: US 6,224,067 B1
(45) Date of Patent: May 1, 2001

(54) HYDROMECHANICAL CHUCK

(75) Inventor: Stefan Lindstrom, Linkoping (SE)

(73) Assignee: ETP Transmission AB (SE)

( * ) Notice: Subject to any disclaimer, the term of this patent is extended or adjusted under 35 U.S.C. 154(b) by 0 days.

(21) Appl. No.: 09/355,451

(22) PCT Filed: Dec. 19, 1997

(86) PCT No.: PCT/SE97/02196

§ 371 Date: Aug. 25, 1999

§ 102(e) Date: Aug. 25, 1999

(87) PCT Pub. No.: WO98/32563

PCT Pub. Date: Jul. 30, 1998

(30) Foreign Application Priority Data

Jan. 28, 1997 (SE) .................................................. 9700237

(51) Int. Cl.[7] .............................. B23B 31/20; B23B 31/30
(52) U.S. Cl. .......................... 279/4.09; 279/43.1; 279/50; 279/43
(58) Field of Search .................................. 279/4.03, 4.07, 279/4.08, 4.09, 43, 43.1, 2.02, 2.03, 2.06–2.09, 50, 54, 57; 403/31, 15; 409/234

(56) References Cited

U.S. PATENT DOCUMENTS

| | | | |
|---|---|---|---|
| 668,286 | * | 2/1901 | Freese ..................................... 279/43 |
| 2,911,222 | * | 11/1959 | Eve ....................................... 279/4.09 |
| 3,835,649 | * | 9/1974 | Le Testu ............................... 279/4.09 |
| 3,977,065 | * | 8/1976 | Johnson ................................ 279/4.09 |
| 4,580,796 | * | 4/1986 | Baur et al. ............................ 279/4.07 |
| 5,192,086 | * | 3/1993 | Bucks .................................... 279/4.09 |

FOREIGN PATENT DOCUMENTS

| | | | |
|---|---|---|---|
| 382517 | * | 11/1964 | (CH) .................................... 279/4.09 |
| 1066211 | * | 4/1967 | (GB) .................................... 279/4.08 |
| 86/01758 | * | 3/1986 | (WO) ................................... 279/4.09 |
| 97/13604 | | 4/1997 | (WO) . |

* cited by examiner

Primary Examiner—Steven C. Bishop
(74) Attorney, Agent, or Firm—Larson & Taylor, PLC

(57) ABSTRACT

A hydromechanical chuck intended to be mounted, with one end thereof, in a machine, such as a drilling machine, milling machine, lathe machine etc. and, with the opposite end thereof to releasably hold a shaft tool like a drill, a milling tool, a rotary saw blade, or a rotary grinding roll. The hydromechanical chuck is formed as a cone coupling chuck comprising a inner sleeve which can change is radial dimensions and has a central bore for receiving the shaft of a shaft tool. The inner sleeve is adapted for being radially compressed against the tool shaft. The hydromechanical chuck has a solid outer sleeve which is axially displaceable on the inner sleeve. The inner sleeve and outer sleeve are formed with a matching cone surface, which, upon a displacement of the outer sleeve on the inner sleeve, provides a radial compression of the inner sleeve. The chuck is formed with a hydraulic clamp pressure chamber comprising a hydraulic pressure medium which, upon pressurization, displaces the outer sleeve on the inner sleeve, thereby connecting the tool. A pressure release chamber releases the joint between the chuck and the tool.

18 Claims, 2 Drawing Sheets

HYDROMECHANICAL CHUCK

Figure 1:
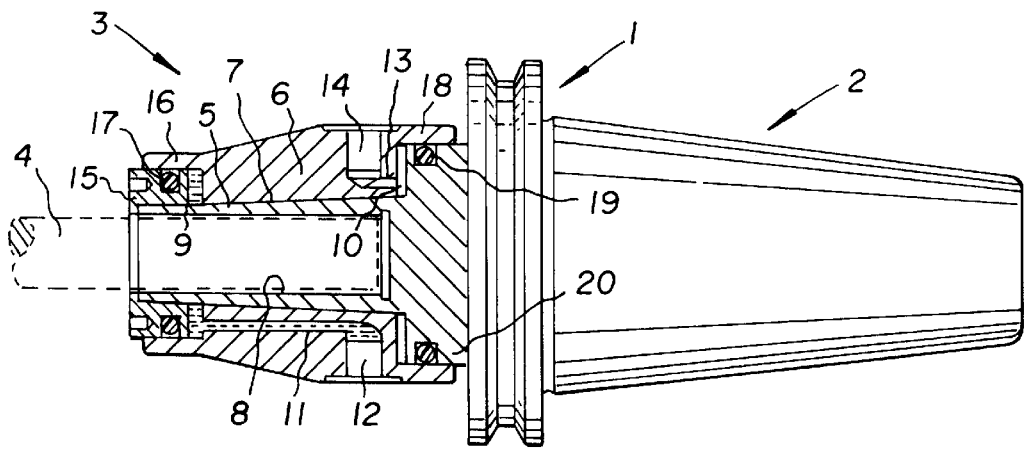

The present invention generally relates to a chuck which is preferably intended to be used, with one end thereof, mounted in a rotary or non-rotary, machine tool, such as a drilling machine, a milling machine, a lathe machine etc., and whereby the opposite end of the chuck releasably holds a shaft tool, a work piece, a transition element or a similar object, like a drill, a milling tool, a rotary saw blade, a grinding roll etc. The chuck can be releasably mounted, or alternatively fixedly mounted in the machine tool. In the case of a releasably mounted chuck the chuck is mounted, for instance by means of a chuck cone part.

Several different embodiments of chucks of the above mentioned general type are known in the art. Such known chucks generally are formed so that the shaft tool is secured in the chuck by means of three or four radially movable clamp jaws which upon tightening are pressed into contact with the tool shaft. Clamp jaws provide a relatively little surface of contact with the tool shaft, and said jaws therefore have to be clamped with a relatively large force in order that the tool should not be capable of rotating in the chuck during machining. Therefore the jaws may damage the tool shaft, and after repeated mounting of the shaft tool the mounting accuracy of the tool can be reduced. The jaws also do not generally provide a prefect accuracy as to centering and balancing of the shaft tool, and it can be a heavy and relatively time consuming operation to clamp connect and to release the tool.

It is also known to mount shaft tools by means of heat clamp joints. It is, however, often difficult and time consuming to clamp connect the tool by such joints, and it is often also difficult to release the joint.

There are also chucks known in the art which are formed as hydraulic clamp bushings in the form of a double walled sleeve comprising a thin inner wall and an all around extending pressure gap which is filled with a hydraulic pressure medium which, upon pressurization, provides a radial compression and an expansion radially inwards of the thin inner wall, and thereby a clamp connecting of the tool shaft in the bushing. Such hydraulic clamp bushings are, however, rather expensive and may, for many purposes, be considered uneconomical.

The present invention relates to an alternative solution of the problem of providing a chuck for shaft tools, in which the chuck is cheaper and more simple as to its structure than the hydraulic clamp bushings, and which provides a better centering and balancing of the tool than conventional chucks having clamp jaws, and which also gives the same complete contact against the tool shaft as the hydraulic clamp bushings. The chuck according to the present invention also provides a very good clamping of the tool in the bushing.

The hydromechanical chuck according to the invention is a type of cone coupling chuck comprising a relatively thin inner sleeve arranged so that is can be radially compressed into contact with the tool shaft, and a solid outer sleeve which is axially displaceable on the inner sleeve, and in which the inner sleeve and the outer sleeve are formed with co-operating cone surfaces which, upon displacement of the outer sleeve on the inner sleeve, provides a radially inwardly directed compressing of the inner sleeve. The conicity preferably is such that the chuck is self locking. It is formed with a first press means for mounting and clamp connecting of the tool and a second press means for releasing the joint. To this end the chuck comprises hydraulic press means for displacing of the outer sleeve in both directions on the inner sleeve, namely a first hydraulic press means for providing such displacement of the outer sleeve on the inner sleeve such that said inner sleeve is compressed in the direction radially inwards into engagement with tool shaft, and a second hydraulic press means for forcing the outer sleeve in the opposite direction thereby providing a releasing of the joint.

The hydraulic press means comprises a first pressure chamber which can be actuated for clamp connecting a tool in chuck and a second pressure chamber for releasing the tool from the chuck.

In one embodiment of the invention the first pressure chamber is provided between the inner sleeve and the outer sleeve adjacent the outer end of the chuck and a second, corresponding pressure chamber is provided adjacent the inner end of the clamp sleeve of the chuck. The pressure chambers can be filled with a hydraulic pressure medium which can be pressurized.

The hydromechanical chuck according to this invention is useful for tools having a shaft of relatively course diameter, for instance a diameter of at least 10 mm. It may be difficult to handle tools of less diameters. In some cases it is possible to use reduction sleeves, but more conveniently the chuck is formed with an elongated tool mounting part having a reduced diameter. In the embodiment where the chuck has the elongated tool mounting part, both pressure chambers are arranged in a pressure head adjacent an inner end thereof. Also in this embodiment a first pressure chamber is adapter for clamp connecting the tool and a second pressure chamber is adapted for releasing the tool.

Now the invention is to be described more closely with reference to the accompanying drawings, in which FIG. 1 shows a hydromechanical chuck according to the invention in a partly cut open condition and in a position in which a shaft tool is about to be mounted.

Figure 2:
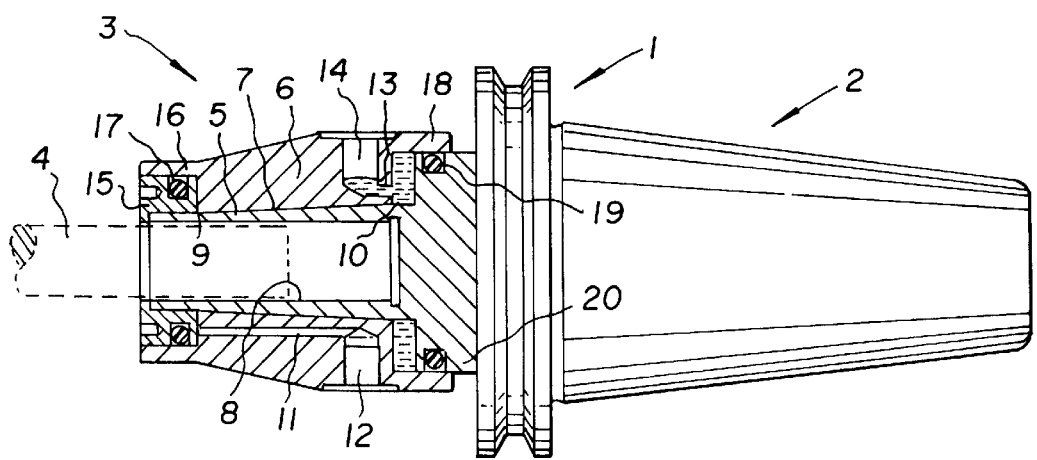

FIG. 2 correspondingly shows the hydromechanical chuck with the tool released therefrom.

Figure 3:
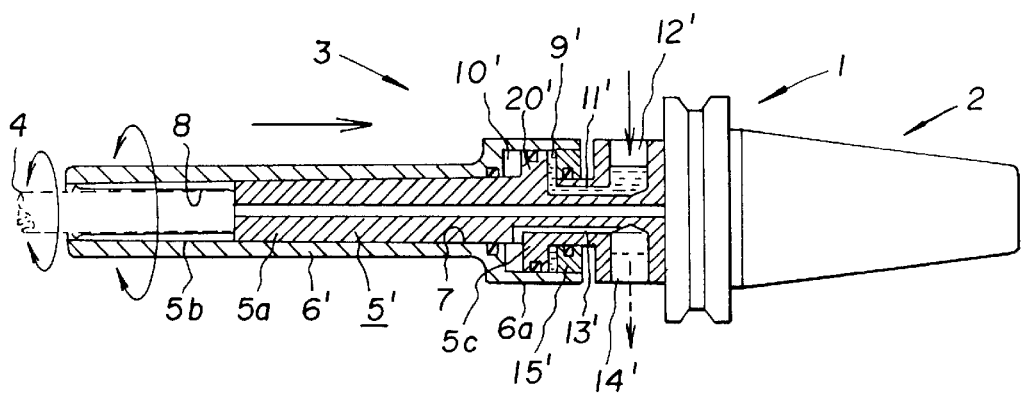
Figure 4:
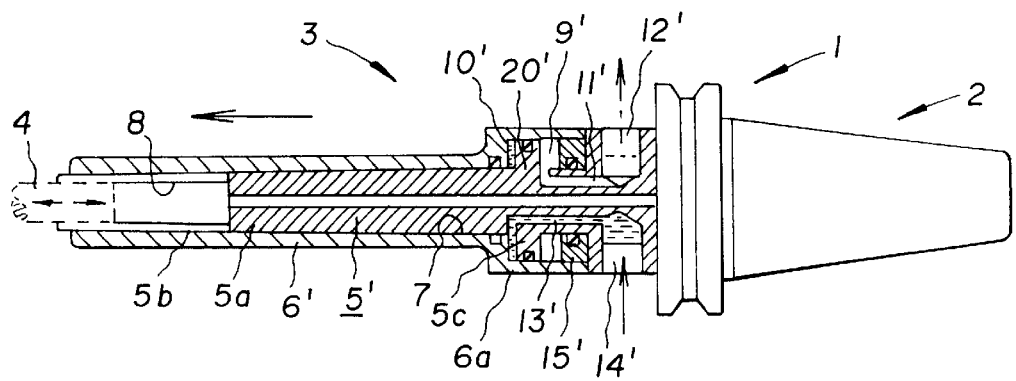

FIG. 3 is an axial cross section through a second embodiment of a chuck according to the invention useful for handling small tools and seen in a tool releasing condition, and FIG. 4 correspondingly shows the chuck of FIG. 3 in a tool connecting condition.

The hydromechanical chuck shown in the drawings generally comprises a transition part 1, for instance in the form of a flange have a V-shaped groove, a chuck cone part 2 adapted to be connected in a corresponding conical cavity of a rotary or non-rotary machine tool, and a clamp body 3 for releasable clamp connecting of a shaft tool 4 and for securing same in the clamp body 3. The transition part 1, the cone part 2 and an inner sleeve of the clamp body 3 are formed as an integral unit. The cone part 2 can be formed with a passageway (not illustrated) for a cooling medium leading to the mounting bore 8 of the inner sleeve.

The transition part 1 with the chuck cone part 2 are of a type known in the art and need not be described in detail. The cone part 2 is designed for being introduced in a corresponding, conically formed cavity of a machine tool, such as a drilling machine, a lathe machine, a milling machine or a similar machine. Of course it is also possible to form the chuck cone part as an integral part of the machine tool, whereby only the clamp body provides the inventional part of the apparatus.

For making it possible to connect a shaft tool 4, the clamp body is formed with an inner sleeve 5 and with an outer sleeve 6. The outer sleeve 6 is axially displaceable on the inner sleeve 5. The inner sleeve 5 has a relatively thin wall for making it possible for the wall to change its shape, especially in connection with a radial compression of the wall towards the shaft of a tool 4 thereby the tool is clamp connected in the chuck. The inner sleeve wall can be split by axial slots thereby presenting several axially extending sleeve portions. If desired, different types of sleeves (for instance reduction sleeves) can be introduced between the shaft of the tool 4 and the inner sleeve 5. The outer sleeve 6 is sufficiently solid that the shape thereof is not remarkably changed when a tool 4 is clamp connected in the inner sleeve 5. The inner sleeve 5 and the outer sleeve 6 have matching cone surfaces 7, the cone angle of which is such that the co-operating cone surfaces 7 are self locking. The inner sleeve 5 has an axial mounting bore 8 for the shaft of the tool 4. The cone part 2 can be formed with a cooling medium passageway (not shown) extending to the mounting bore 8 thereof. Between the inner and outer sleeves 5, 6 there are two pressure chambers, a first pressure chamber 9 adjacent the outer end of the clamp sleeve 3 for providing a displacement inwards, that is in a tightening direction, of the outer sleeve 6 on the inner sleeve 5, thereby providing a compressing of the inner sleeve 5 and a clamp connecting of the tool 4, and a second pressure chambers 10 adjacent the inner end of the clamp sleeve 3 for providing a displacement in the opposite direction of the outer sleeve 6, thereby providing a releasing of the tool 4. The pressure chambers 9 and 10 are arranged for being pressurized by means of a suitable pressure medium. The first pressure chamber 9 is, over a passageway 11, connected to a first pressure nipple 12, and the second pressure chamber 10 is, over a passageway 13, connected to a second pressure nipple 14. The pressure nipples 12 and 14, respectively, are preferably connected to an (not illustrated) external pressurization pump. For sealing the first pressure chamber 9, a sealing nut 15 in screwed onto the end of the inner sleeve 5, and the outer sleeve 6 has an axially outwardly projecting flange 16 which, over conventional sealing rings 17, seals against the outer surface of the sealing nut 15. Correspondingly the outer sleeve 6 is, at the inner end thereof, formed with a projecting axial flange 18 which over sealing rings 19 seals against a cylindrical part 20 at the inner end of the inner sleeve 5.

The chuck is supplied to the customer with the inner and outer sleeves 5 and 6 connected to each other and with the sealing nut 15 screwed onto the inner sleeve 5. Both pressure chambers 9 and 10 are free of pressure, and the outer sleeve 6 is in its expelled position, as shown in FIG. 2.

A shaft tool 4 is mounted such that the tool is introduced into the inner bore 8 of the inner sleeve 5; the outer pressure chamber 9 is pressurized by means of a hydraulic pressure medium of a predetermined pressure force from the nipple 12 and over the pressure passageway 11, whereby the pressure in the pressure chamber 9 provides a displacement of the outer sleeve 6 in the tightening direction, that is axially inwards on the inner sleeve 5, as shown in FIG. 1, whereby the wall of the inner sleeve 5 is being radially compressed, and whereby the tool 4 is centered and clamp connected in the chuck by the inner sleeve 5. Since the cone surfaces are self locking there is no risk that the clamp joint will become unintentionally released. It is not necessary that the mounting bore is cylindrical but it can be adapted to the shape of the shaft to be clamp connected. Thus, the bore 8 can have a polygonal, square, octagonal etc. cross section shape.

It should be noted that the pressure chambers 9 and 10 need not be pressurized during operation, since the tool is completely secured in the inner sleeve by a mechanical joint. The hydraulic pressurization must be executed only during mounting and dismounting of the tool 4.

For releasing the tool, the release pressure chamber 10 is pressurized over the nipple 14 and the passageway 13, whereby the outer sleeve 6 is forced in the direction towards the outer end of the chuck, as shown in FIG. 2, whereby the inner sleeve 5 expands radially outwardly and regains its original shape so that the tool 4 becomes released.

In one embodiment of the invention, the inner cone sleeve 5 preferably tapers in the direction towards the outer end of the sleeve. Actually the conicity can be the opposite. In such a case it is, however, necessary that the sleeve 5 is releasably connected to the cylindrical part 20.

The chuck can be reused several times. Of course it is also possible to keep the tool 4 clamp connected in the clamp chuck 3 after the machining has been finished, and to remove the entire chuck from the machine tool and to reserve the combined unit of chuck and tool for subsequent working with the same tool.

It may be difficult to use tools having small diameters with the apparatus shown in FIGS. 1 and 2 since the pressure chamber 9 at the outer end of the sleeves 5 and 6 necessarily must have a certain radial dimension.

Therefore FIGS. 3 and 4 show an alternative embodiment of the invention which is useful for small diameter tools, for instance tools having a diameter of less than 10 mm. FIG. 3 shows the clamp bushing while the bushing is about to clamp connect the tool 4, and FIG. 4 shows the bushing while releasing the tool.

In the illustrated embodiments the clamp body 3' is formed with an elongated inner sleeve 5' and an elongated outer sleeve 6'. The inner sleeve is formed with a solid inner sleeve part 3a and an outer slotted clamp sleeve part 3b extending less than halfway out along the outer sleeve 6' and opening adjacent the outer end thereof. The inner end of the outer sleeve 6' is formed as a pressure head 6a enclosing both the clamp pressure chamber 9' with the pressure nipple 12' and the pressure medium passageway 11' and the pressure release chamber 10' with the pressure nipple 14' and the pressure medium passageway 13'. The pressure head 6a is formed with an axially inwardly directed cylindrical flange 18' which, by a threaded screw/nut 15', provides an inner wall against which the pressure medium of the clamp pressure chamber 9' is acting thereby forcing the outer sleeve 6 towards the transition part 1, whereby the outer sleeve slides along the inner sleeve 5', and whereby the cone surface 17' causes a compression of the clamp sleeve part 5b against the tool 4, as shown in FIG. 3. The inner sleeve is formed with a radially outwardly extending flange 5c acting as a reference wall for both pressure chambers 9' and 10'.

FIG. 4 shows the operation of releasing of the tool 4, whereby pressure medium is introduced in the release pressure chamber 10' over the passageway 13' and the nipple 14', whereby the outer sleeve 6' slides axially outwardly along the inner sleeve 5' thereby releasing the tool 4.

The elongated tool mounting part of the clamp body 3' can be formed with a very narrow tool mounting bore 8'. The tool mounting part also can be made with any desired length so that the tool is placed at any desired distance from the transition part 1 and chuck cone part 2.

REFERENCE NUMERALS

FIGS. 1 and 2
1 transition part
2 chuck cone part
3 clamp body
4 tool
5 inner sleeve
6 outer sleeve 7 cone surface
8 bore
9 pressure chamber
10 return pressure chamber
11 passageway
12 pressure nipple
13 passageway
14 pressure nipple
15 nut
16 flange
17 sealing ring
18 flange
19 sealing ring
20 cylindrical part
FIGS. 3 and 4
5a solid sleeve part
5b clamp sleeve part
5c reference wall
6a pressure head

What is claimed is:

1. A hydromechanical clamp connection apparatus to be mounted in a rotary machine and to hold a shaft of a rotary shaft tool, said hydromechanical clamp comprising:

a cone coupling chuck having a machine end for mounting in the rotary machine and, having a tool end opposite the machine end thereof, for releasably holding the shaft of the rotary shaft tool, said chuck has a thin inner sleeve with radial dimensions which can be changed, and having a central axial bore for receiving the shaft of the shaft tool, and adapted for being radially compressed against the shaft of the shaft tool, said chuck having a solid outer sleeve axially displaceable on said inner sleeve, said inner sleeve and said outer sleeve formed with matching cone surfaces of a self locking type which, upon a displacement of said outer sleeve on said inner sleeve provides a radial compression of at least part of said inner sleeve, said inner sleeve and said outer sleeve each having a tool end and a machine end, said chuck having hydraulically actuateable means for providing a displacement of said outer sleeve on said inner sleeve, said hydraulically actuateable means having a first hydraulic pressurization means for mounting and clamp connecting the rotary shaft tool and a second hydraulic pressurization means for releasing the rotary shaft tool, respectively.

2. The hydromechanical clamp according to claim 1, wherein said inner sleeve tapers in a direction towards said tool end.

3. The hydromechanical clamp according to claim 1, wherein said hydraulic means comprises a hydraulic pressure chamber adjacent each end of said inner sleeve and said outer sleeve.

4. The hydromechanical clamp according to claim 1, wherein said chuck is formed with a clamp pressure chamber adjacent said tool end of said inner sleeve and a pressure release chamber adjacent said machine end of said inner sleeve, said clamp pressure chamber and said pressure release chamber arranged for being filled and pressurized with a hydraulic pressure medium.

5. The hydromechanical clamp according to claim 1, wherein said inner sleeve has a sealing nut formed with a cylindrical sealing surface at said tool end, said outer sleeve has an axially projecting flange which sealingly engages said sealing nut of said inner sleeve, and said chuck further comprises a clamp pressure chamber formed between said sealing nut and said outer sleeve, said pressure chamber pressurizeable by a hydraulic pressure medium over a passageway and a pressurization nipple.

6. The hydromechanical clamp according to claim 1, wherein said inner sleeve has a radially projecting cylindrical flange, said outer sleeve has an axially projecting flange which sealingly extends over said radially projecting cylindrical flange, and a pressure release chamber is formed between said inner and outer sleeves at said machine end, said pressure release chamber is adapted to be pressurized with a hydraulic pressure medium over a passageway and a pressure nipple.

7. The hydromechanical clamp according to claim 1, wherein said chuck is formed with an elongated tool mounting part, and said inner and said outer sleeves are formed with a pressure head adjacent said machine end of said inner sleeve and said outer sleeve and said pressure head has both a clamp pressure chamber and a pressure release chamber.

8. The hydromechanical clamp according to claim 7, wherein said inner sleeve is formed with an inner solid part and an outer clamp sleeve part changeable in its radial dimensions when said outer sleeve is slid along said inner sleeve.

9. The hydromechanical clamp according to claim 7, wherein said pressure head is formed by an axially inwardly projecting flange of said outer sleeve, said axially inwardly projecting flange enclosing both said clamp pressure chamber and said pressure release chamber, and said inner sleeve is formed with a radially outwardly projecting flange providing a pressure reaction wall for both said clamp pressure chamber and said pressure release chamber.

10. A chuck in the form of a hydromechanical clamp connection apparatus having a machine end for mounting in a rotary machine tool and a tool end for holding a shaft of a rotary shaft tool, said chuck comprising:

an inner sleeve with variable radial dimensions and having a tool end and a machine end, said inner sleeve having a central axial bore adapted for receiving the shaft of the shaft tool at said tool end and adapted for being radially compressed against the shaft of the shaft tool;

a solid outer sleeve axially displaceable on said inner sleeve and having a tool end and a machine end, said inner sleeve and said outer sleeve formed with matching and self locking cone surfaces, said outer sleeve adapted for providing a radial compression of at least a part of said inner sleeve upon displacement of said outer sleeve on said inner sleeve; and a hydraulically actuateable means for providing a displacement of said outer sleeve on said inner sleeve, said hydraulically actuateable means having a first hydraulic pressurization means adapted for mounting and clamp connecting the rotary shaft tool and a second hydraulic pressurization means adapted for releasing the rotary shaft tool, respectively.

11. The chuck according to claim 10, wherein said inner sleeve tapers in a direction towards said tool end.

12. The chuck according to claim 10, wherein said hydraulic means comprises a hydraulic pressure chamber adjacent each end of said inner sleeve and said outer sleeve.

13. The chuck according to claim 10, further comprising:

a clamp pressure chamber adjacent said tool end of said inner sleeve; and a pressure release chamber adjacent said machine end of said inner sleeve, said clamp pressure chamber and said pressure release chamber arranged for being filled and pressurized with a hydraulic pressure medium.

14. The chuck according to claim 10, wherein said inner sleeve has a sealing nut formed with a cylindrical sealing surface at said tool end, said outer sleeve has an axially projecting flange which sealingly engages said sealing nut of said inner sleeve, and said chuck further comprises a clamp pressure chamber formed between said sealing nut and said outer sleeve, said pressure chamber pressurizeable by a hydraulic pressure medium over a passageway and a pressurization nipple.

15. The chuck according to claim 10, wherein said inner sleeve has a radially projecting cylindrical flange, said outer sleeve has an axially projecting flange which sealingly extends over said radially projecting cylindrical flange, and a pressure release chamber is formed between said inner and outer sleeves at said machine end, said pressure release chamber is adapted to be pressurized with a hydraulic pressure medium over a passageway and a pressure nipple.

16. The chuck according to claim 10, further comprising:

an elongated mounting part formed by said inner sleeve and said outer sleeve; and a pressure head adjacent respective said machine ends of said inner sleeve and said outer sleeve, said pressure head having both a clamp pressure chamber and a pressure release chamber.

17. The chuck according to claim 16, wherein said inner sleeve is formed with an inner solid part and an outer clamp sleeve part changeable in its radial dimensions when said outer sleeve is slid along said inner sleeve.

18. The chuck according to claim 16, wherein said pressure head is formed by an axially inwardly projecting flange of said outer sleeve said flange enclosing both said clamp pressure chamber and said pressure release chamber, and said inner sleeve formed with a radially outwardly projecting flange providing a pressure reaction wall for both said clamp pressure chamber and said pressure release chamber.

* * * * *